United States Patent [19]
Aberi et al.

[11] Patent Number: 5,246,192
[45] Date of Patent: Sep. 21, 1993

[54] MOUNTING APPARATUS FOR A SCANNER CAMERA

[75] Inventors: Abbas Aberi, Fairport; Carl A. Luft, Lima; Ali R. Baradar, Rochester, all of N.Y.

[73] Assignee: Eastman Kodak Company, Rochester, N.Y.

[21] Appl. No.: 904,628

[22] Filed: Jun. 26, 1992

[51] Int. Cl.$^5$ .................................. F16M 11/04
[52] U.S. Cl. .................................. 248/178; 355/55; 359/830
[58] Field of Search .................... 248/178; 355/55, 67; 359/830, 819, 823, 827

[56] References Cited

U.S. PATENT DOCUMENTS

| | | | |
|---|---|---|---|
| 3,652,152 | 3/1972 | Thursby, Jr. | 350/252 |
| 4,068,936 | 1/1978 | Kushima | 359/819 X |
| 4,226,392 | 10/1980 | Healy | 248/178 |
| 4,319,836 | 3/1982 | Murata et al. | 355/55 |
| 4,473,293 | 9/1984 | Phillips | 355/67 X |
| 4,511,237 | 4/1985 | Kawata et al. | 355/3 R |
| 4,571,062 | 4/1986 | Yoshioka et al. | 355/8 |
| 4,585,308 | 4/1986 | Negoro | 350/252 |
| 4,603,826 | 8/1986 | Ekstrand | 248/178 X |
| 4,607,943 | 8/1986 | Yoshioka et al. | 355/14 R |
| 4,747,669 | 5/1988 | Yamada | 359/827 X |
| 4,825,247 | 4/1989 | Kemi | 355/55 |
| 4,892,283 | 1/1990 | Cutburth | 248/178 X |
| 4,948,226 | 8/1990 | Ozaki | 359/819 |
| 5,075,719 | 12/1991 | Hyodo | 355/55 |
| 5,150,260 | 9/1992 | Chigira | 359/823 X |
| 5,166,829 | 11/1992 | Iizuka | 359/823 X |

FOREIGN PATENT DOCUMENTS 0212604  9/1991  Japan ..................... 359/830

Primary Examiner—J. Franklin Foss
Attorney, Agent, or Firm—J. Gary Mohr

[57] ABSTRACT

An apparatus for mounting the optical unit of an image forming apparatus so that when the optical unit is removed from its mounting, within the image forming apparatus, for maintenance or the like, it can be easily and accurately reinserted. The mounting apparatus has a bottom wall and vertical walls at opposite ends of the bottom wall, with supporting pads formed on the vertical walls for supporting and aligning the optical unit. A clamp is provided for securing the optical unit to the mounting. When the clamp is laid over the optical unit, the optical unit remains secured within the mounting. An adjustment thumbscrew is provided for moving the optical unit within the mounting.

6 Claims, 6 Drawing Sheets

MOUNTING APPARATUS FOR A SCANNER CAMERA

BACKGROUND OF THE INVENTION

1. Technical Field

The present invention relates to an optical aligning and retaining device for use in an image forming apparatus.

2. Prior Art

In general, devices of this type include, as disclosed in U.S. Pat. No. 4,585,308, a cylindrical lens frame holder mounted on a housing in an image forming apparatus. The housing is substantially U-shaped with retaining devices located on the vertical walls of the housing that retain a tying band for securing the cylindrical lens frame holder to the housing. In this type of conventional mounting device, however, there is no assurance, other than to perform time consuming measurements and tests, such as done at the point of original manufacture, that when the lens frame holder is removed from its housing within the image forming apparatus it will be properly positioned when re-inserted into the housing. Therefore, if the lens frame holder is removed from the housing, for instance, for maintenance or replacement, it is extremely difficult to accurately remount the lens frame holder, in the field, and re-establish the optimum position that was established at the original point of manufacture. What is, therefore, needed is a housing device that is simple in construction, has relatively few parts, but allows for accurate mounting and securing of an optical device, such as an electronic scanning camera, in the field.

SUMMARY OF THE INVENTION

In view of the above-described difficulties accompanying conventional holding devices, it is an object of the present invention to provide a mounting apparatus that is simple in construction, has relatively few parts, but allows for accurate mounting and securing of an optical device. The present invention provides such an apparatus by providing a mounting apparatus for aligning and maintaining in alignment an optical apparatus, the mounting apparatus comprising:

a housing having a bottom wall and two vertical walls, supporting means for supporting the optical apparatus within the housing and providing a surface upon which the optical apparatus is moved within the housing, adjusting means for moving the optical apparatus upon the supporting means, cooperating means between the optical apparatus and the housing for rotationally positioning the optical apparatus within the housing, and retaining means laid over said optical apparatus and secured to said housing for retaining the optical apparatus within the housing after the optical apparatus has been aligned in the housing.

DESCRIPTION OF THE PREFERRED EMBODIMENT OF THE INVENTION

Figure 1:
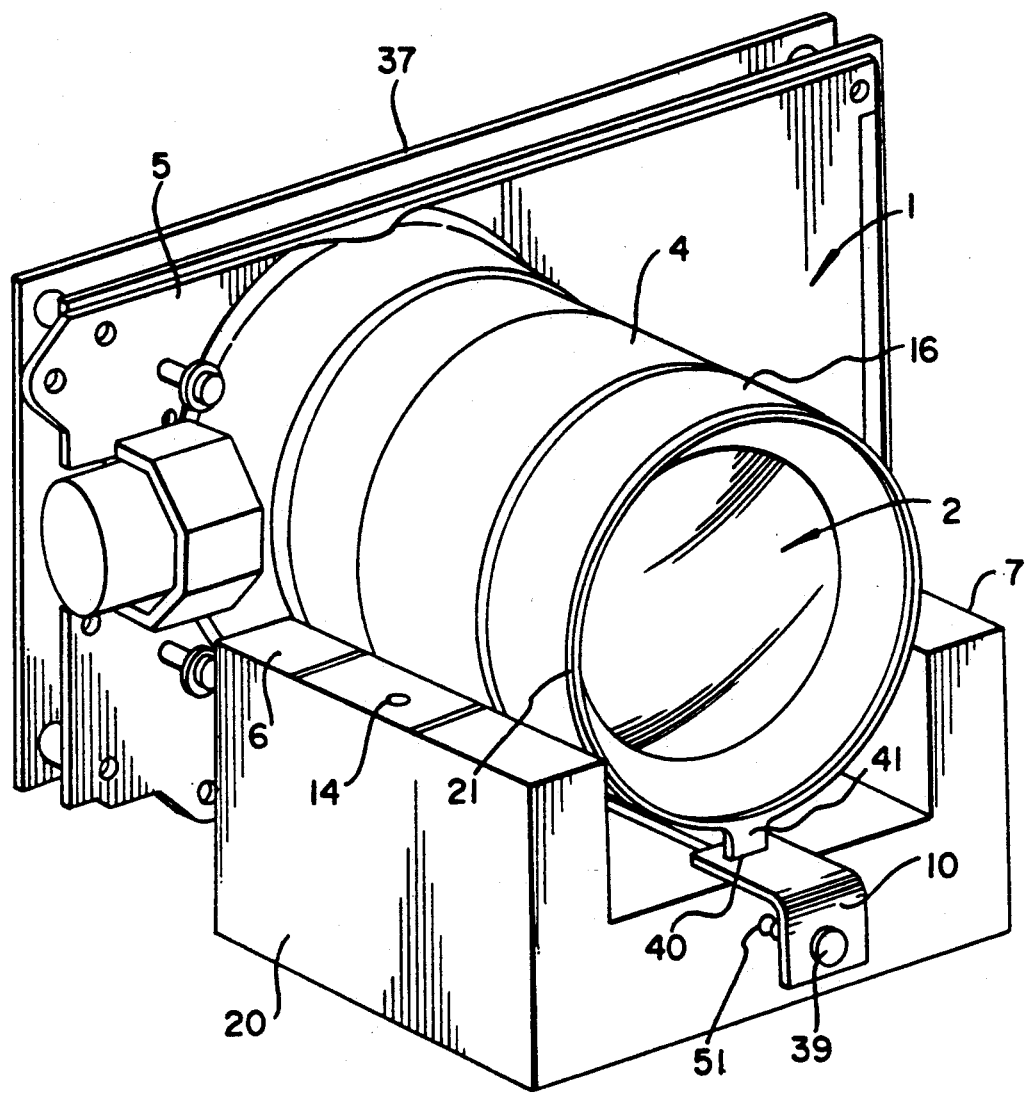
FIG. 1 is a perspective view of an electronic scanning camera and retaining chassis, in accordance with the present invention.

While the present invention is susceptible to embodiments of many different forms, there is shown in the drawings and hereinafter described, in detail, a preferred embodiment of the invention. It should be understood, however, that the present disclosure is to be considered an exemplification of the principles of the invention and is not intended to limit the invention to the embodiments illustrated and/or described.

For ease of description, the mechanism will be described in its normal operational position, and terms such as upper, lower, horizontal, etc., will be used with reference to normal operating positions. It, however, may be manufactured, stored, transported and sold in an orientation other than the normal operational positions described.

In describing the preferred embodiment of the present invention, reference is made to the drawings, wherein like numerals indicate like parts and structural features in the various views, diagrams and drawings.

Figure 6:
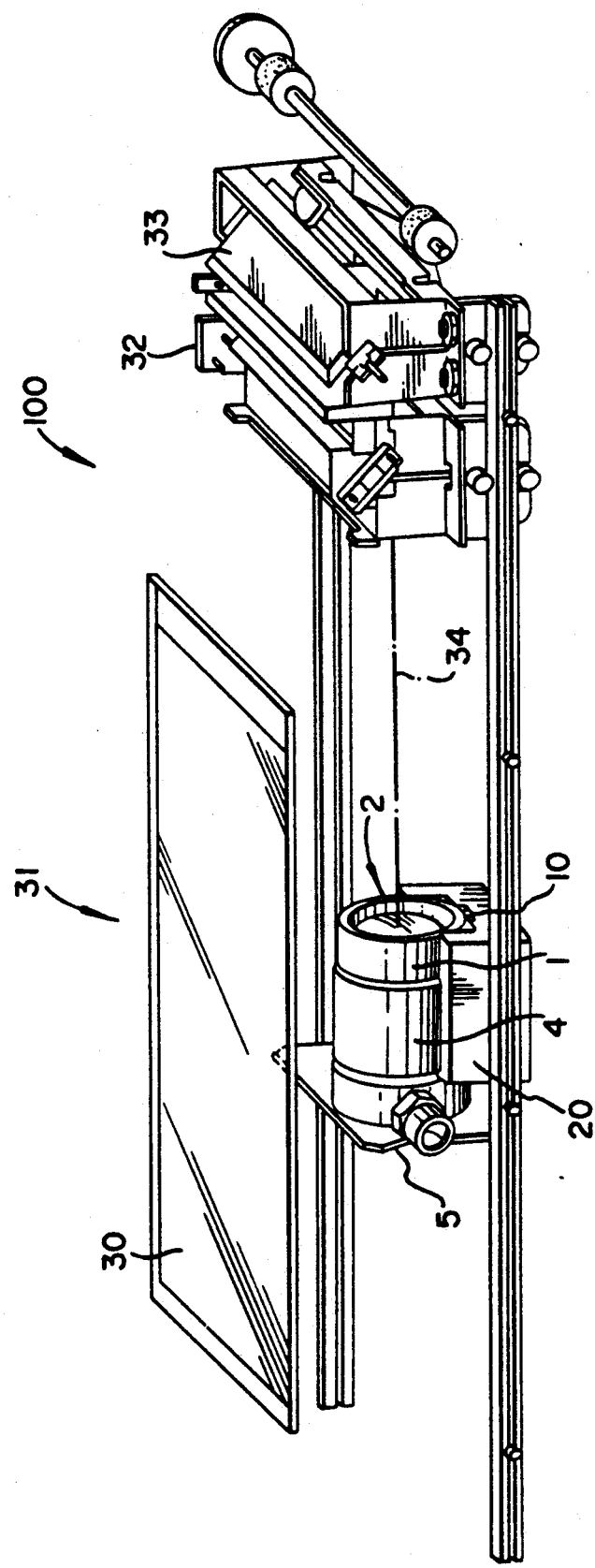
FIG. 6 is a perspective view of the electronic scanning camera and retaining chassis mounted in a typical image forming device.

According to FIG. 6, an electronic scanning camera 1 is mounted in a housing, such as a retaining chassis 20, secured within an image forming apparatus 100, thereby aligning electronic scanning camera 1 to receive image informational light rays 34. With this type of mounting, when an original document, not shown, is placed upon platen 30, of reproduction station 31, and exposed to a scanning light from exposure station 32, in a manner and by means known in the art, the scanned light reflected from said original document to mirror assembly 33, is then reflected, by mirror assembly 33, as image informational light rays 34, to a lens system 2, mounted in a lens barrel 16, see FIG. 3, of electronic scanning camera 1. Lens system 2 then directs image informational light rays 34 onto a CCD 36, mounted on a CCD housing 5, which, in turn, is mounted on a CCD drive board 37 of electronic scanning camera 1. As shown in FIG. 6, both CCD housing 5 and CCD drive board 37 have no mechanical mounting to image forming apparatus 100, other than being mounted to lens barrel 16.

For image forming apparatus 100 to produce the best images, image informational light rays 34, from the originally scanned document, should be received perpendicular to the surface of CCD 36. For CCD 36 to receive image informational light rays 34 perpendicular to its surface, proper alignment between platen 30, exposure station 32, mirror assemble 33, lens system 2, opening 38, in CCD housing 5, and CCD 36 is critical.

If the foregoing components are not properly aligned, image informational light rays 34, that are to be converted by CCD 36, as known in the art, into machine readable electronic signals, will not result in image forming apparatus 100 producing sharp image reproductions.

Since platen 30, exposure station 32 and mirror system 33 are integral parts of image forming apparatus 100, retaining chassis 20 is secured to image forming apparatus 100 and lens system 2 and CCD 36 are integral parts of electronic scanning camera 1, the positional alignment among the foregoing components is highly dependant upon the mounting of electronic scanning camera 1 in retaining chassis 20. However, the mounting and retaining of electronic scanning camera 1, in retaining chassis 20, requires the aligning and retaining of electronic scanning camera 1 in relation to six degrees of movement freedom with retaining chassis 20. Those six degrees of movement freedom being three degrees of linear freedom and three degrees of rotational freedom about the X, Y and Z axis of retaining chassis 20, see FIG. 2.

Figure 3:
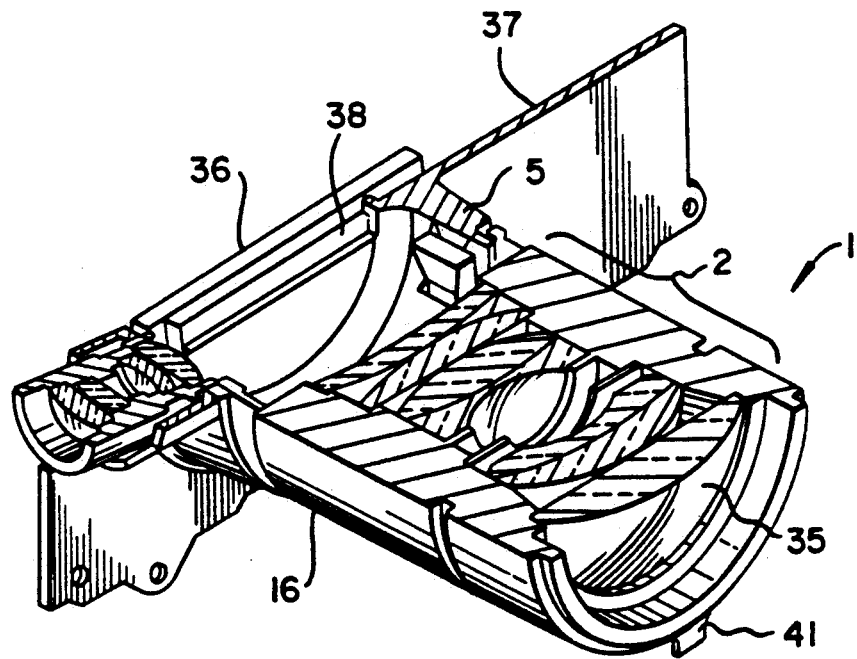
FIG. 3 is a perspective cut away view of the electronic scanning camera in accordance with the present invention.
Figure 5:
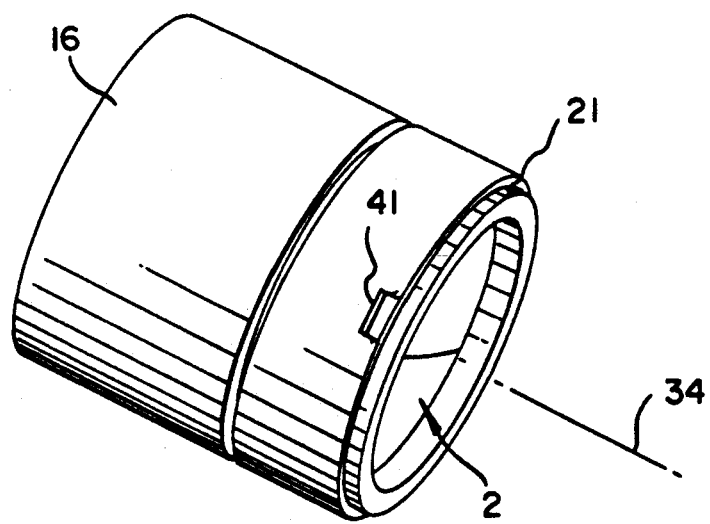
FIG. 5 is a perspective view of the lens barrel of the electronic scanning camera in accordance with the present invention.
Figure 7:
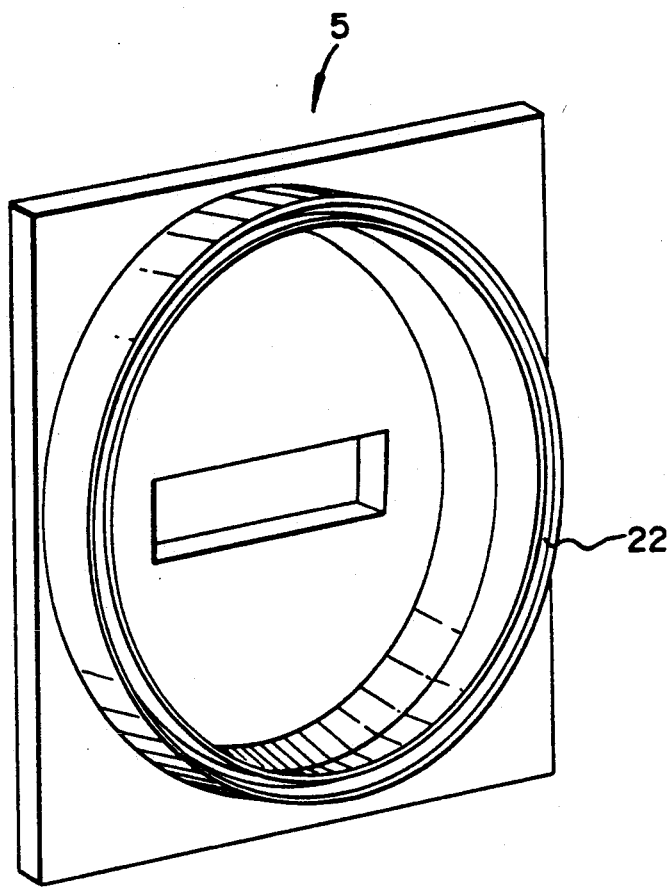
FIG. 7 is an exploded perspective view of a charged coupled device (CCD) housing, in accordance with the present invention.

For a clear understanding of the explanation to follow, regarding the mounting of electronic scanning camera 1 in retaining chassis 20, the critical components of retaining chassis 20 and electronic scanning camera 1, as well as the assembly of electronic scanning camera 1 should be identified and understood. Retaining chassis 20 has, as shown in FIG. 1, a keyway 12, vertical walls 6 and 7, mounting pad 28, 29 and 30, located on inside walls 8 and 9 of vertical walls 6 and 7, and retainer mountings 14 and 15 (see FIGS. 8 & 9). The critical components of electronic scanning camera 1, on the other hand, as shown in FIGS. 1 & 3, include lens barrel 16 containing lens system 2, CCD 36, CCD drive board 37, a guide ring 21, a tab 41 on ring 21 (see FIG. 5) and CCD housing 5, see FIG. 7.

Assembly of electronic scanning camera 1 is performed so that CCD 36 is secured in a position both perpendicular to the optical axis of lens system 2 and at the focal point of lens system 2. Rotationally lens system 2 is secured within a lip 22, of CCD housing 5, to minimize the effect of lens system 2 imperfections on image informational light rays 34 transmitted through lens system 2.

Once the above assembly of electronic scanning camera 1 is complete and lens barrel 16 is fixed securely within lip 22, of CCD housing 5, the aligning and mounting of electronic scanning camera 1 within chassis 20 is preformed, at the point of manufacture, so that electronic scanning camera 1 may function cooperatively with image forming apparatus 100. To function cooperatively with image forming apparatus 100, electronic scanning camera 1 is aligned within image forming apparatus 100 such that image informational light rays 34 are received by CCD 36: (a) perpendicular to the surface of CCD 36, (b) parallel to platen 30, (c) with minimal effect caused by imperfections in lens system 2, and (d) in the same plane as a plane that passes through the center of CCD 36 and lens system 2 and which plane is parallel to platen 30. With the accomplishment of this alignment, ring 21, with tab 41, is permanently secured to lens barrel 16 to identify the rotational portion of the above alignment, for future field use. This identification of the proper rotational positioning of lens barrel 16, containing lens system 2, is critical, since the quality or imperfections of the lens used in lens system 2 are such that an image transmitted through one axis of lens system 2 may not produce as sharp and image on CCD 36 as an image transmitted through another axis of lens system 2, therefore, once the optimum axis is located, the rotational position of lens barrel 16, creating transmission of light rays 34, through that optimum axis, must be permanently identified so that lens barrel 16 will be placed in chassis 20 in that rotational position.

While alignment and mounting of electronic scanning camera 1 within image forming apparatus 100, in the above manner, is relatively easy to accomplish, at the point of manufacture, when using sophisticated alignment machinery, it would be very difficult and not suited for performance, in the field, without the alignment and mounting features of the present invention. By use of the aligning and mounting features of the present invention, field mounting of electronic scanning camera 1, in retaining chassis 20, is reduced to manual alignment of only one degree of motion freedom as opposed to six. This is the result of the present invention establishing the following positional restraints between electronic scanning camera 1 and retaining chassis 20.

Figure 2:
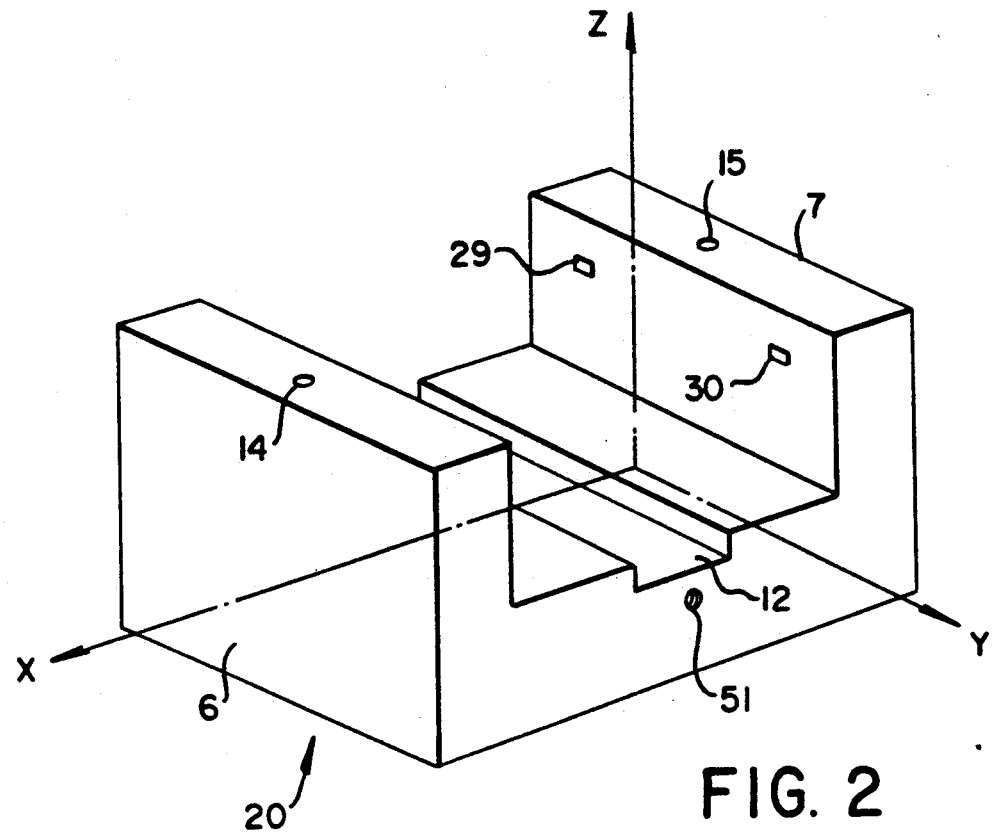
FIG. 2 is a perspective view of the retaining chassis in accordance with the present invention.
Figure 9:
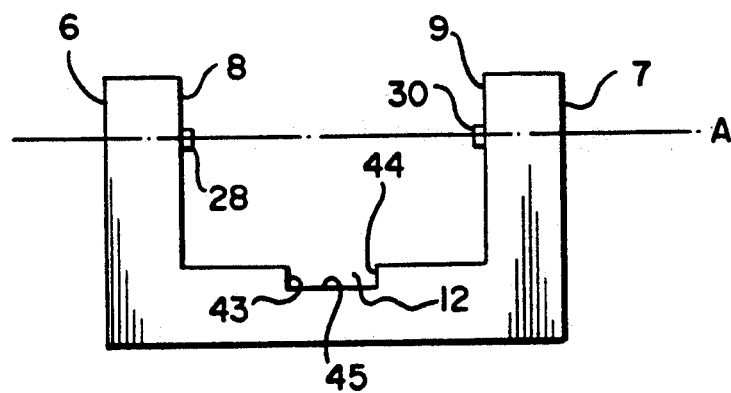
FIG. 9 is a front view of the retaining chassis in accordance with the present invention.

(1) Rotational alignment of electronic scanning camera 1 in relation to the Y axis of retaining chassis 20, is established and retained, by tab 41 being inserted into a keyway 12, of retaining chassis 20, see FIGS. 2 & 9, such that tab 41 makes mating contact with walls 43 and 44 of keyway 12, but does not contact wall 45. In this manner tab 41 does not interfere with the linear alignment of electronic scanning camera 1 along the Z axis of retaining chassis 20.

Figure 4:
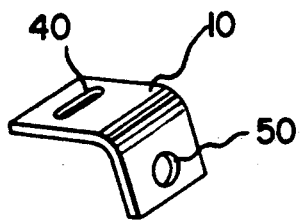
FIG. 4 is a perspective view of the adjustment clamp in accordance with the present invention.

The linear alignment of electronic scanning camera 1, relative to the Y axis of retaining chassis 20, which is the only alignment that is not self aligning, as to field installation, when inserting electronic scanning camera 1 into retaining chassis 20, is accomplished by rotation of a thumb screw 39. Thumb screw 39 is retained, as is known in the art, but free to rotate in hole 50, of an adjustment bracket 10 and is in mating contact with a threaded hole 51 of retaining chassis 20, see FIGS. 2 & 4. Adjustment bracket 10 has a slot 40 which securely mates with tab 41 of ring 21, see FIG. 1. Therefore, as thumb screw 39 is rotated clockwise, it rotates within hole 50 and threads into hole 51, of retaining chassis 20, compressing a contact spring mounted over the threaded portion of thumb screw 39 and located between adjustment bracket 10 and retaining chassis 20. This causes adjustment bracket 10 to push electronic scanning camera 1 away from mirror assembly 33, within a plane A, see FIG. 9, established by pad 28 on inside wall 8 and pads 29 and 30 on inside wall 9. As electronic scanning camera 1 moves in plane A, tab 41 slides in keyway 12, of retaining chassis 20, thereby maintaining the rotational alignment of electronic scanning camera 1 along the Y axis of retaining chassis 20, as above stated. Counterclockwise motion of thumb screw 39 causes thumb screw to unthread-thread from hole 51, in retaining chassis 20, and the contact spring to expand causing adjustment bracket 10 to pull electronic scanning camera 1 toward mirror assembly 33, over plane A, as tab 41 slides in keyway 12, of retaining chassis 20, to maintain the rotational alignment of electronic scanning camera 1 along the Y axis of retaining chassis 20.

(2) Linear and rotational alignment of electronic scanning camera 1 in relation to the X axis of retaining chassis 20 is established and retained by lens barrel 16, of electronic scanning camera 1, resting against the aforesaid mentioned pads 28, 29 and 30 and the mating of tab 41 with keyway 12. Since, as heretofore stated, the bottom portion of tab 41 does not touch wall 45 of keyway 12, tab 41 does not interfere with the way lens barrel 16 rests on pads 28, 29 and 30.

Figure 8:
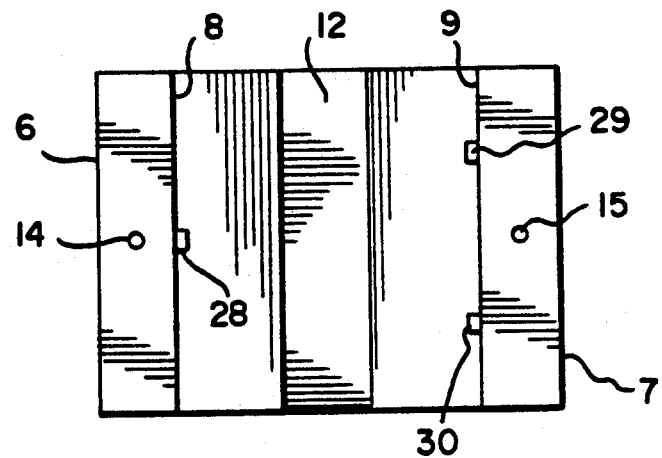
FIG. 8 is a top view of the retaining chassis in accordance with the present invention.

(3) Linear and rotational alignment of electronic scanning camera 1 in relation to the Z axis of retaining chassis 20 is established and retained by the heretofore mentioned pads 28, 29 and 30 upon which lens barrel 16 rest as well as a retaining clamp 4. Retaining clamp 4, see FIGS. 1 & 8, is mounted to vertical walls 6 and 7 by fixing screws being placed through retaining clamp 4 and into threaded holes 14 and 15 to securely fix retaining clamp 4 over lens barrel 16. This securing, of lens barrel 16, by retaining clamp 4 also maintains electronic scanning camera 1 from movement on or about the other aligning and retaining elements of electronic scanning camera 1 and retaining chassis 20.

With the construction of electronic scanning camera 1 and retaining chassis 20, being as above stated, the mere placing of electronic scanning camera 1 in retaining chassis 20 aligns and retains electronic scanning camera 1 over five degrees of movement freedom, leaving only one degree of movement freedom, that being linear alignment along the Y axis of retaining chassis 20, to be adjusted. To accomplish this linear alignment along the Y axis, in the field, is relatively easy. One merely places a target image on platen 30 and reproduces it with image forming apparatus 100. The magnification and focus, as represented by the reproduced copy, is then compared to the original target and if there is a match, no adjustment is needed. If, however, there isn't a match, thumb screw 39 is either rotated clockwise or counter-clockwise until the magnification and focus, as represented by the reproduced copy, matches the original target. Retaining clamp 4 is then placed over lens barrel 16 and secured to retaining chassis 20 thereby securing electronic scanning camera 1, in its aligned position, within retaining chassis 20.

While the invention has been described in detail with particular reference to a preferred embodiment thereof, it will be understood that variations and modifications can be effected within the spirit and scope of the invention as described hereinabove and as defined in the appended claims.

We claim:

1. A mounting apparatus for aligning and maintaining in alignment an optical apparatus, the mounting apparatus comprising:
    a housing having a bottom wall and two vertical walls,
    supporting means for supporting the optical apparatus within the housing and providing a surface upon which the optical apparatus is moved within the housing,
    adjusting means for moving the optical apparatus upon the supporting means,
    cooperating means between the optical apparatus and the housing for rotationally positioning the optical apparatus within the housing, and
    retaining means laid over said optical apparatus and secured to said housing for retaining the optical apparatus within the housing after the optical apparatus has been aligned in the housing.

2. The mounting apparatus of claim 1, wherein the supporting means are pads located on the vertical walls of the housing for contacting the optical apparatus at three points thereby forming a plane upon which the optical apparatus rest.

3. The mounting apparatus of claim 1, wherein the adjusting means includes:
    the cooperating means,
    the supporting means, and
    connecting means affixed to a portion of the cooperating means and in contact with the housing for imparting reciprocal movement to the optical apparatus.

4. The mounting apparatus of claim 1, wherein the cooperating means includes a tab on the optical apparatus that mates with means within the housing for allowing linear motion, but preventing rotational motion of the optical apparatus within the housing.

5. The mounting apparatus of claim 1, wherein the retaining means includes a band secured to the vertical walls of the housing and in pressure contact with the optical apparatus.

6. An image forming apparatus having a mounting device for aligning and maintaining in alignment an optical apparatus, said mounting device comprising:
    a housing having a bottom wall and two vertical walls,
    supporting pads located on the vertical walls of the housing for contacting the optical apparatus at three points thereby forming a plane upon which the optical apparatus is supported and moved within the housing,
    adjusting means for moving the optical apparatus upon the supporting pads,
    cooperating means between the optical apparatus and the housing for rotationally positioning the optical apparatus within the housing, and
    a band laid over said optical apparatus and secured to said housing for retaining the optical apparatus within the housing after the optical apparatus has been aligned in the housing.

* * * * *